(12) United States Patent
Altena et al.

(10) Patent No.: US 6,214,200 B1
(45) Date of Patent: Apr. 10, 2001

(54) METHOD AND ARRANGEMENT FOR THE ELECTROCHEMICAL MACHINING OF A WORKPIECE

(75) Inventors: Hermanus S. J. Altena; Maarten Brussee; Anton M. Boorsma; Foppe Kramer, all of Drachten (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/286,115

(22) Filed: Apr. 2, 1999

(30) Foreign Application Priority Data

Apr. 6, 1998 (EP) .................................................. 98201081

(51) Int. Cl.$^7$ ............................... B23H 3/00; B23H 7/18; B23H 7/32
(52) U.S. Cl. .......................... 205/652; 205/654; 205/685; 205/686; 204/224 M; 204/225
(58) Field of Search ................................... 205/652, 654; 204/224 M, 225

(56) References Cited

U.S. PATENT DOCUMENTS 3,448,024 * 6/1969 Philpott ............................. 205/654 X
4,264,417 4/1981 Vasiliev et al. .................... 204/129.7
6,059,954 * 5/2000 Suda et al. ........................ 205/654 X

FOREIGN PATENT DOCUMENTS

1815038A1 5/1993 (SE) .

OTHER PUBLICATIONS

"Modelling and Monitoring Interelectrode Gap in Pulse Electrochemical Machining" by K.P. Rajurkar et al, Annals of the CIRP. vol. 44/1/1995, pp. 177–180.

* cited by examiner

*Primary Examiner*—Donald R. Valentine
(74) *Attorney, Agent, or Firm*—Ernestine C. Bartlett

(57) ABSTRACT

In a method for electrochemical machining, the working distance is set by contacting the workpiece with the electrode, increasing the distance between the workpiece and the electrode by a first distance, detecting whether the contact between the electrode and the workpiece is broken, and further increasing the distance between the workpiece and the electrode by a second distance. Owing to this method, very small working distances can be set with a limited risk of short-circuiting and flash-over.

13 Claims, 3 Drawing Sheets

METHOD AND ARRANGEMENT FOR THE ELECTROCHEMICAL MACHINING OF A WORKPIECE

BACKGROUND OF THE INVENTION

The invention relates to a method of electrochemically machining a workpiece by means of an electrode, comprising the steps of bringing the workpiece and the electrode into contact with one another, setting a working distance between the electrode and the workpiece while keeping the gap between the workpiece and the electrode filled with an electrolyte, and passing an operating current through the electrolyte in the gap via the electrode and the workpiece in order to machine the workpiece.

The invention further relates to an arrangement for electrochemically machining a workpiece by means of an electrode, in which a working distance is set between the electrode and the workpiece while the gap between the workpiece and the electrode is filled with an electrolyte, and in which the workpiece is machined by passing an operating current through the electrolyte in the gap via the electrode and the workpiece, which arrangement includes a base for positioning a workpiece, a holder for positioning an electrode, an actuator for moving the holder and the base with respect to one another, a detection device for detecting contact between the electrode and the workpiece, and a control unit for controlling the actuator.

Moreover, the invention relates to a control unit for controlling an actuator in an arrangement for electrochemically machining a workpiece by means of an electrode.

Such a method is known from the publication "Modelling and Monitoring Interelectrode Gap In Pulse Electrochemical Machining" in Annals of the CIRP Vol. 44/1/1995. In the known method a workpiece is machined by means of an electrode in an electrolyte consisting of a 15% solution of NaCl in water. Said publication states that the machining accuracy is higher when a small working distance is provided between the electrode and the workpiece. In a test mode a working distance of at least 0.1 mm is set, after which an operating current is passed through the electrolyte in the gap between the workpiece and the electrode. According to the publication this working distance is usually set by bringing the electrode and the workpiece into contact with one another and subsequently positioning the electrode at a desired distance from the workpiece. A disadvantage of this method is that in the case of a small working distance being set it is not unlikely that a flash-over or a short-circuit occurs between the electrode and the workpiece when the operating current is applied, as a result of which the electrode and/or the workpiece are damaged by the heat produced by the operating current at the location of the flash-over or the short-circuit.

SUMMARY OF THE INVENTION

It is an object of the invention to reduce the likelihood of a flash-over or a short-circuit. To this end, the method in accordance with the invention is characterized in that the working distance is set by increasing the distance between the electrode and the workpiece by a first distance starting from a situation of contact between the electrode and the workpiece, followed by detecting whether the contact between the electrode and the workpiece is broken, and increasing the distance between the workpiece and the electrode by a second distance if the detection shows that the contact between the electrode and the workpiece has been broken.

The invention is based on the recognition of the fact that moving the electrode and the workpiece away from one another over a desired distance after they have brought into contact does not always result in the desired working distance being set. Owing to a resilient element the resulting working distance may be smaller than the desired working distance and it is even possible that electrical contact persists. The likelihood of this is substantial if the desired working distance is of the order of micrometers. Said resilient element may form part of the arrangement used for positioning the electrode with respect to the workpiece and/or may be formed by a burr or contaminant in the gap. If the working distance is smaller than desired, the current density is higher than intended and there is a large risk of gassing in the gap. As a result of this, there is a large risk of flash-over. If electrical contact persists after the working distance has been set the current density at the location of this electrical contact owing to the operating current will be so high that the electrode and/or the workpiece may be damaged. The measures in accordance with the invention ensure that the actual gap has at least the magnitude of the second distance. This precludes short-circuiting or the generation of a flash-over. As a result of these measures the risk of damaging of the workpiece and/or the electrode is reduced substantially and a working distance of an order of magnitude of micrometers can be set in a reliable manner.

The measure of setting working distance by a method wherein the first distance is a predetermined distance and the first distance is comparatively small with respect to the second distance has the advantage that the uncertainty as regards the magnitude of the working distance set is small with respect to the average magnitude of the working distance set. This results in a uniform dissolution rate and an accurate reproduction of the electrode.

The measures of setting working distance by a method wherein the distance between the workpiece and the electrode is increased by a third distance, after which the electrolyte in the gap is renewed by flushing, upon which the workpiece and the electrode are again brought into contact with one another if the contact between the electrode and the workpiece is found not to be broken after the predetermined distance has been set have the advantage that if the electrical contact is not interrupted by the presence of a burr or a contaminant the burr or the contaminant can be detached by increasing the distance between the electrode and the workpiece and can, for example, be flushed away with the electrolyte. The optimum value for the third distance depends on the geometry and will be approximately 0.1 mm in practice.

The measure of setting working distance by a method wherein the steps of bringing the workpiece and the electrode into contact with one another and setting the working distance (dw) between the electrode and the workpiece are repeated periodically has the advantage that a possible drift in working distance is corrected periodically and that the electrolyte can better flow through and, as a consequence, can better renew when the gap is enlarged.

The measure of setting working distance by a method wherein as a result of the operating current material of the workpiece is dissolved and during the passage of an operating current through the electrolyte the electrode and the workpiece are moved towards one another in accordance with an estimate of the rate (Vf) at which the material is dissolved has the advantage that the magnitude of the working distance remains substantially constant during the dissolution of the workpiece.

The measure of estimating the dissolution rate (Vf) from the relative displacement between the electrode and the workpiece between two contacting phases is a simple method for estimating the dissolution rate.

The measure of detecting contact between the electrode and the workpiece by connecting a current-limited voltage source between the electrode and the workpiece and monitoring the voltage difference between the electrode and the workpiece has the advantage that the presence of contact between the electrode and the workpiece can be detected by simple means.

The measure of employing a voltage source that supplies a voltage (Um) between 1 and 3 V has the advantage that, on the one hand, the voltage is high enough to minimize noise and battery effects between the workpiece and the electrode and, on the other hand, the voltage is low enough to preclude dissolving of the electrode or the workpiece.

The measure of using an electrolyte comprised of $NaNO_3$ has the advantage that the workpiece dissolves at a high rate when the current density is high and dissolves at a low rate when the current density is low. Since the current density decreases as the distance between the electrode and the workpiece increases, this measure ensures that the so-called lateral dissolution is limited and the machined surface of the workpiece is approximately a negative of the electrode surface.

The measure of setting a working distance smaller than 50 $\mu$m has the advantage that the machining rate and the accuracy are substantially higher than in the case of the working distance magnitudes used in the prior art. The measures in accordance with the invention enable such a small working distance to be established in a reliable manner, thus enabling said advantages to be obtained without an increased risk of damage to the workpiece and/or the electrode. It has been found that the measures of setting the first distance at a value which lies between 2 and 10 $\mu$m and the second distance at a value which lies between 5 and 30 $\mu$m yield particularly satisfactory results. The optimum value of the first distance depends on the movement tolerances and the resilience in the arrangement and is preferably determined empirically. The optimum value of the second distance depends in particular on the electrode geometry and is preferably also determined empirically.

The arrangement and the control unit in accordance with the invention are characterized in that the control unit is adapted to set a first distance between the electrode and the workpiece, to detect whether the contact between the electrode and the workpiece is broken, and to increase the distance between the workpiece and the electrode by a second distance.

BRIEF DESCRIPTION OF THE DRAWINGS

The invention will now be described in more detail, by way of example, with reference to the drawings, in which.

DESCRIPTION OF THE PREFERRED EMBODIMENTS

Figure 1:
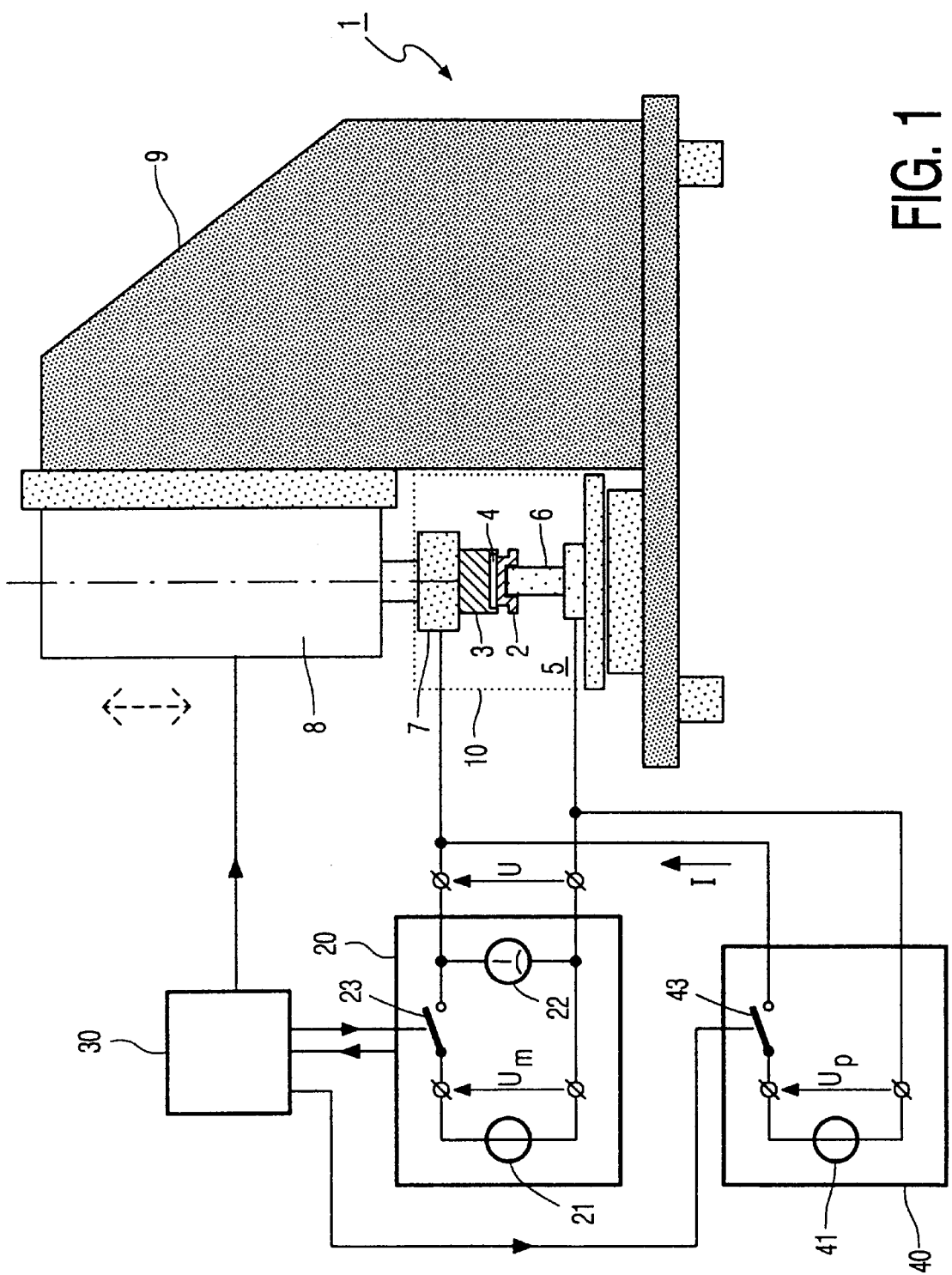
FIG. 1 shows diagrammatically an arrangement 1 for the electrochemical machining of a workpiece 2 with the aid of an electrode 3.

FIG. 1 is a diagrammatic representation of an arrangement 1 for electrochemically machining a workpiece 2 by means of an electrode 3. The arrangement 1 comprises a base 6 for positioning a workpiece 2, a holder 7 for positioning an electrode 3, and an actuator 8 for moving the holder 7 and the base 6 with respect to one another. The base 6 and the actuator 8 are mounted on a chassis 9 having a rigid construction so as to enable a working distance dw between the electrode 3 and the workpiece 2 to be set with a high accuracy. The arrangement further comprises a reservoir 10 filled with an electrolyte 5 in such a manner that the gap 4 formed as a result of the working distance dw between the electrode 3 and the workpiece 2 is filled with the electrolyte 5. In the present case the electrolyte comprises $NaNO_3$ dissolved in water. As an alternative, it is possible to use another electrolyte, such as for example sodium chlorate or a combination of $NaNO_3$ and an acid. The electrolyte 5 is pumped through the gap 4 by means of an installation, not shown. By means of the arrangement 1 the workpiece 2 can be machined by passing an operating current I from a power supply 40 through the electrolyte 5 in the gap 4 via the electrode 3 and the workpiece 2. When the polarity of the operating current I is correct this results in material of the workpiece 2 being dissolved in the electrolyte 5 at the location of a small distance between the electrode and the workpiece. As a result of this, the shape of the electrode 3 is copied in the workpiece 2. The arrangement 1 further comprises a detection device 20 for detecting contact between the electrode 3 and the workpiece 2 and a control unit 30 for controlling the actuator 8. The detection device 20 comprises a current-limited voltage source 21, which in the present case supplies a voltage Um of approximately 2 V as long as the current limiter is not activated, and a monitor 22 for monitoring the voltage difference U between the electrode 3 and the workpiece 2. The control unit 30 is adapted to carry out the method in accordance with the invention as described with reference to FIG. 2.

Figure 2:
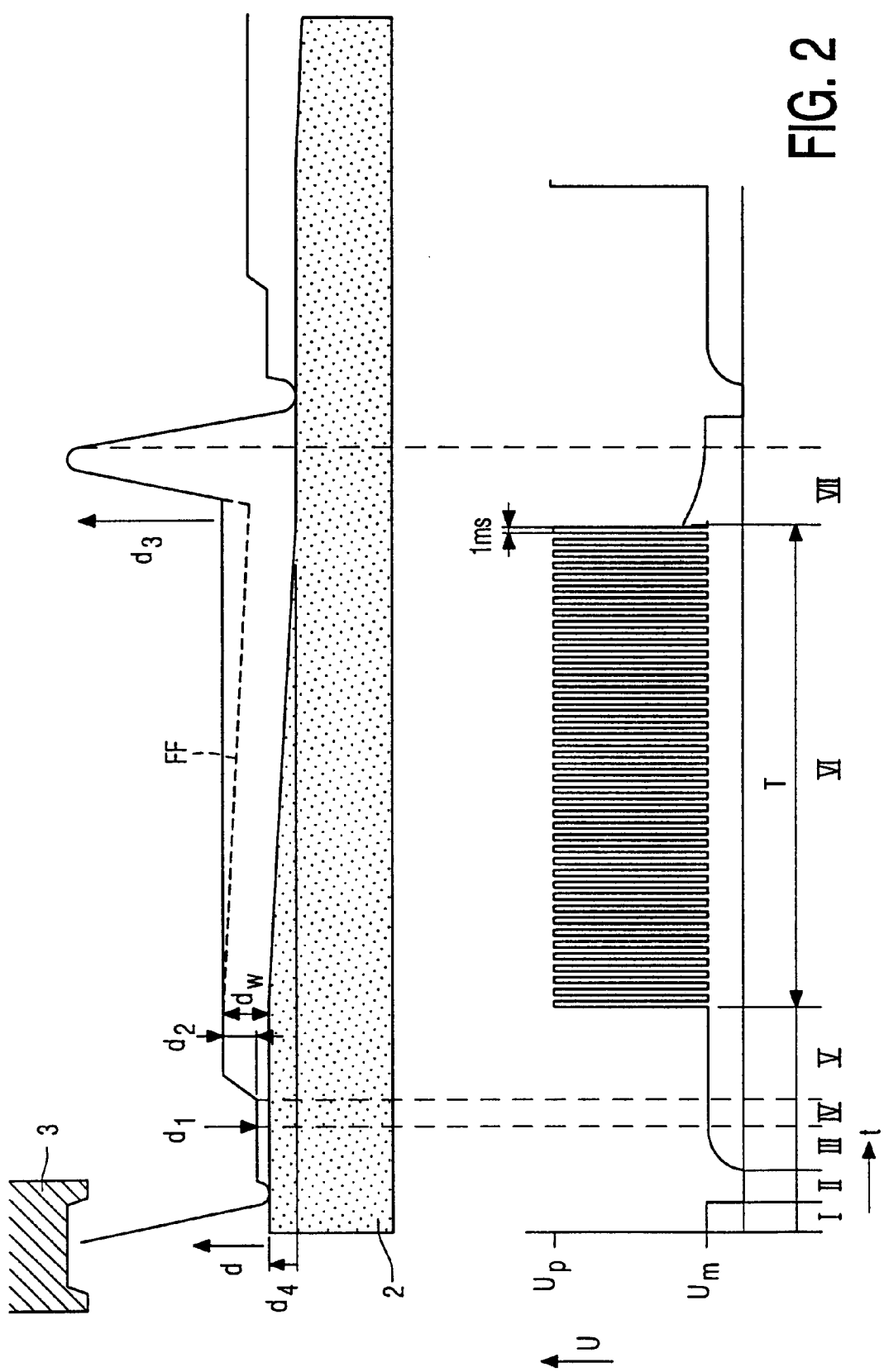
FIG. 2 represents diagrammatically the magnitude d of the gap 4 between the workpiece 2 and the electrode 3 and the voltage U as functions of time during carrying out of the method in accordance with the invention.

FIG. 2 represents diagrammatically the distance d between the workpiece 2 and the electrode 3 and the voltage U as functions of time during carrying out of the method in accordance with the invention. In a first phase I, according to this method, the switch 23 (see FIG. 1) is closed and the distance d between the workpiece 2 and the electrode 3 is reduced until the workpiece 2 and the electrode 3 come into contact with one another. As a result of this contact, the current limiter is activated and the voltage U decreases to approximately 0 V (phase II). Subsequently, a working distance dw between the electrode 3 and the workpiece 2 is set, starting from the situation of contact between the electrode 3 and the workpiece 2, by increasing the distance d between the electrode 3 and the workpiece 2 by a first distance d1 (phase III), followed by a detection, by monitoring the voltage U, whether the contact between the electrode 3 and the workpiece 2 is broken (phase IV), and increasing the distance d between the workpiece 2 and the electrode 3 by a second distance d2 (phase V) if the detection shows that the voltage U is again approximately 2 V as an indication that the contact between the electrode 3 and the workpiece 2 is broken. Preferably, the working distance dw is smaller than 50 µm. In addition, the spread in the actual working distance dw is limited by selecting a predetermined value for the first distance d1 and by selecting the first distance d1 to be comparatively small with respect to the second distance d2. Satisfactory results have been obtained with d1 between 2 and 10 µm and d2 between 5 and 30 µm.

Preferably, the detection whether the contact between the electrode 3 and the workpiece 2 is broken, by monitoring the voltage U (phase IV), is effected some time after the first distance d1 has been set (phase III). This is because it has been found that in phase m the voltage slowly returns to the original level Um. This is caused by a battery effect in the electrolyte 5. The detection whether the contact between the electrode 3 and the workpiece 2 is broken, by monitoring the voltage U Chase IV), is preferably effected by determining whether the voltage U is greater than, for example, 0.5 Um so as to minimize the influence of battery effects and other noise or interference sources on the detection.

After the working distance has been set in accordance with the described method an operating current I from the power supply 40 is passed during a phase VI through the electrolyte 5 in the working distance dw by closing the switch 43. Preferably, the power supply 40 supplies a pulsed voltage Up because it has been found that this results in a more uniform dissolution of the workpiece 2 than in the case of a continuous voltage. Subsequently, the distance between the workpiece 2 and the electrode 3 is increased by a distance d3 in a phase VII, thus enabling the electrolyte 5 in the working distance dw to be renewed easily. At a working distance dw of some tens of micrometers the electrolyte is rapidly saturated because the flow rate of the electrolyte through such a working distance is inadequate. After the distance d has been increased, the working distance dw is preferably set again in accordance with the method according to the invention so as to periodically repeat the operations of bringing the workpiece 2 and the electrode 3 into contact and setting a working distance dw between the electrode 3 and the workpiece 2.

In FIG. 2 the letters FF indicate an embodiment in which during the passage of the operating current I through the electrolyte 5 the electrode 3 and the workpiece 2 are moved towards one another in accordance with an estimate of the rate Vf at which the material is dissolved. This dissolution rate Vf can be estimated, for example, on the basis of the relative displacement d4 of the electrode 3 and the workpiece 2 between two contacting phases.

Figure 3:
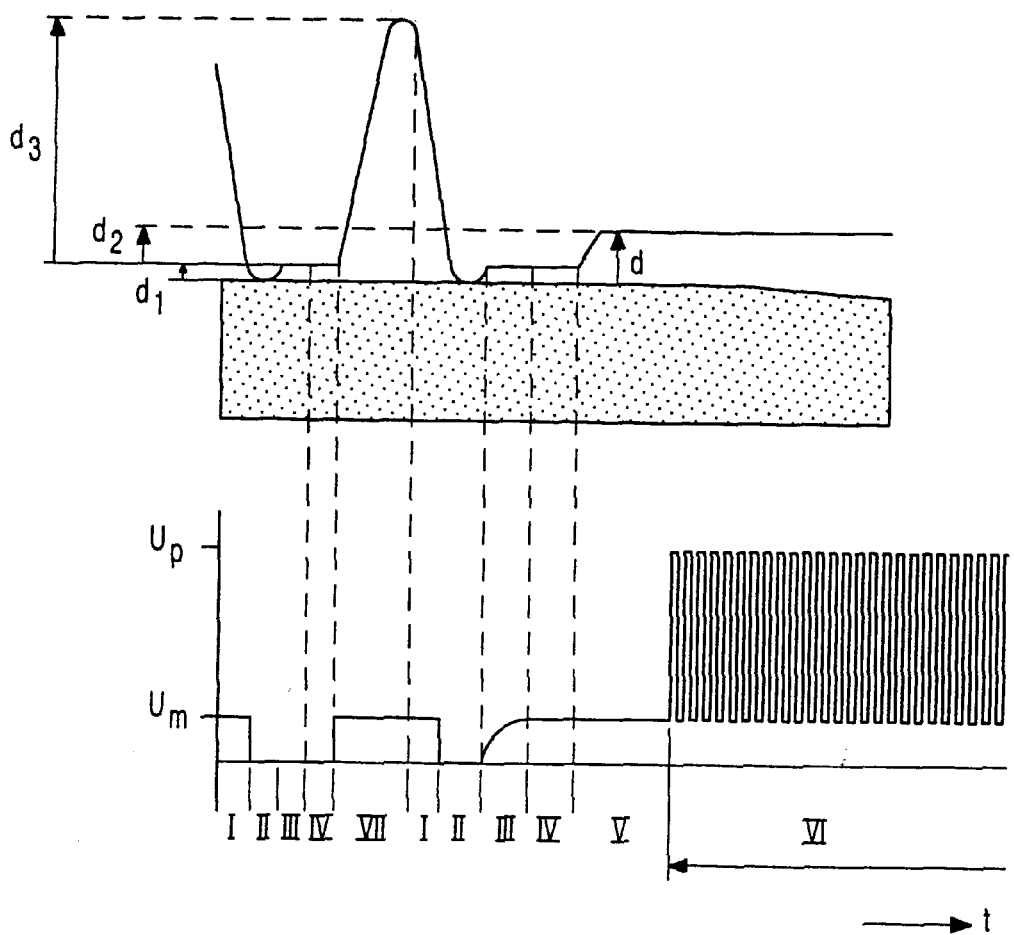
FIG. 3 shows diagrammatically the distance d between the workpiece 2 and the electrode 3 and the voltage U as functions of time during carrying out of the method in accordance with the invention in the case that the contact is found not be broken after the distance between the workpiece 2 and the electrode 3 has been increased by the first distance d1 and FIG. 4 is a graph which represents the dissolution rate Vf as a function of the working distance dw for different operating voltages U1 and U2.

FIG. 3 shows diagrammatically the distance d between the workpiece 2 and the electrode 3 and the voltage U as functions of time during carrying out of the method in accordance with the invention in the case that the contact is found not to be broken after the distance d between the workpiece 2 and the electrode 3 has been increased by the first distance d1 (phase IV). In this case, similarly to phase VII in FIG. 2, the distance between the workpiece 2 and the electrode 3 is increased by a third distance d3, which is followed by the steps as outlined with reference to FIG. 2.

Figure 4:
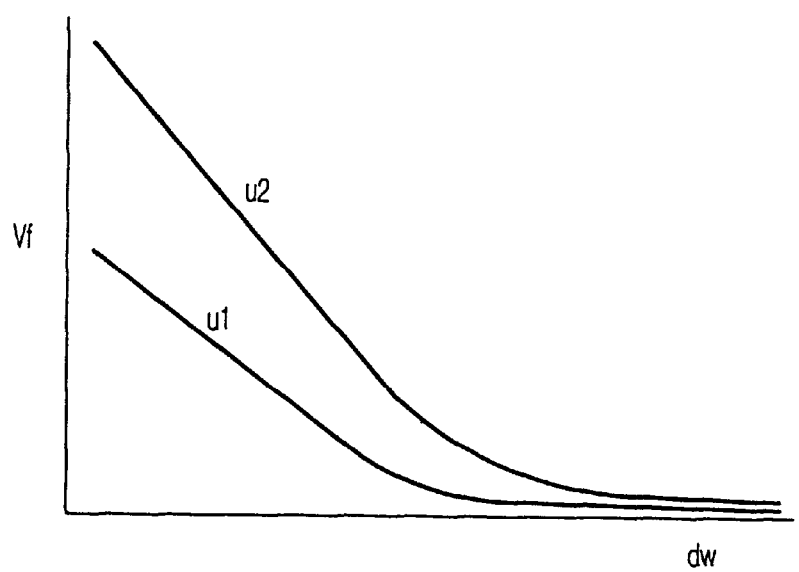

FIG. 4 is a graph which represents the dissolution rate Vf as a function of the working distance dw for different operating voltages U1 and U2, which comply with U2>U1. This graph shows that the dissolution rate Vf increases substantially as the working distance dw decreases. The measures in accordance with the invention enable much smaller working distances to be set than indicated in the afore-mentioned publication without an increased risk of damage to the workpiece 2 or the electrode 3 as a result of short-circuiting or flash-over. As a result of this, a higher dissolution rate $V_f$ is achieved. At the same time, a higher accuracy is achieved in that dissolution in a lateral direction rapidly leads to a distance d which results in a comparatively low dissolution rate Vf (see FIG. 4), so that a machined surface of the workpiece 2 is approximately a negative copy of the corresponding surface of the electrode 3.

It is to be noted that the invention is not limited to the variants shown. Several other variants are possible without departing from the scope of the invention. Thus, it is possible to detect the contact between the electrode and the workpiece in another way, for example by means of a pulsed current source or voltage source or by means of a pressure transducer which measures the force exerted on the workpiece by the electrode. The detection whether the contact is broken after the distance between the electrode 3 and the workpiece 2 has been increased by the first distance can also be effected by means of a complex criterion such as the average of the voltage U, at option in combination with the spread of the voltage U during phase IV. Moreover, it is possible to achieve a satisfactory renewal of the electrolyte in the gap by an appropriate geometry of the electrolyte, which enables the periodic enlargement of the gap to be omitted.

We claim:

1. A method of electochemically machining a workpiece by means of an electrode, comprising the steps of
    bringing the workpiece and the electrode into contact with one another,
    setting a working distance (dw) between the electrode and the workpiece while keeping a gap between the workpiece and the electrode filled with an electrolyte, and
    passing an operating current through the electrolyte in the gap via the electrode and the workpiece in order to machine the workpiece,
wherein the working distance (dw) is set by
    increasing, initially from a situation of contact between the electrode and the workpiece, a distance (d) between the electrode and the workpiece by a first distance (d1) to form an increased distance,
    detecting whether the contact between the electrode and the workpiece is broken, and
    increasing the increased distance between the workpiece and the electrode by a second distance (d2) if the detecting shows that the contact between the electrode and the workpiece is broken.

2. A method as claimed in claim 1, wherein the first distance (d1) is a predetermined distance and the first distance (d1) is comparatively small with respect to the second distance (d2).

3. A method as claimed in claim 2, wherein the distance (d) between the workpiece and the electrode is increased by a third distance (d3), after which the electrolyte in the gap is renewed by flushing, upon which the workpiece and the electrode are again brought into contact with one another if the contact between the electrode and the workpiece is found not to be broken after the predetermined distance (d1) has been set.

4. A method as claimed in claim 1, wherein the steps of bringing the workpiece and the electrode into contact with one another and setting the working distance (dw) between the electrode and the workpiece are repeated periodically.

5. A method as claimed in claim 4, wherein the dissolution rate (Vf) is estimated on the basis of a relative displacement (d4) between the electrode and the workpiece between two contacting phases.

6. A method as claimed in claim 1, wherein as a result of the operating current material of the workpiece is dissolved, and during the passage of an operating current through the electrolyte the electrode and the workpiece are moved towards one another in accordance with an estimate of a dissolution rate (Vf) at which the material is dissolved.

7. A method as claimed in claim 1, wherein contact between the electrode and the workpiece is detected by connecting a current-limited voltage source between the electrode and the workpiece and monitoring a voltage difference between the electrode and the workpiece.

8. A method as claimed in claim 7, wherein the voltage source supplies a voltage between 1 and 3 V.

9. A method as claimed in claim 1, wherein the electrolyte comprises $NaNO_3$.

10. A method as claimed in claim 1, wherein the working distance (dw) is smaller than 50 µm.

11. A method as claimed in claim 10, wherein the first distance (d1) lies between 2 and 10 µm and the second distance (d2) lies between 5 and 30 µm.

12. An arrangement for electrochemically machining a workpiece by means of an electrode, in which a working distance (dw) is set between the electrode and the workpiece while the gap between the workpiece and the electrode is filled with an electrolyte wherein the workpiece is machined by passing an operating current through the electrolyte in the gap via the electrode and the workpiece, said arrangement including a base for positioning the workpiece, a holder for positioning the electrode, an actuator for moving the holder and the base with respect to one another, a detection device for detecting contact between the electrode and the workpiece, and a control unit for controlling the actuator, wherein the control unit is adapted to increase a distance (d) between the electrode and the workpiece by a first distance (d1) starting from a situation of contact between the electrode and the workpiece, to detect whether the contact between the electrode and the workpiece is broken, and to increase the distance (d) between the workpiece and the electrode by a second distance (d2).

13. A control unit for controlling an actuator in an arrangement for electrochemically machining a workpiece by means of an electrode, wherein the control unit is adapted to increase a distance (d) between the electrode and the workpiece by a first distance (d1) starting from a situation of contact between the electrode and the workpiece, to detect whether the contact between the electrode and the workpiece is broken, and to increase the distance (d) between the workpiece and the electrode by a second distance (d2).

* * * * *